Patented Mar. 26, 1940

2,194,683

UNITED STATES PATENT OFFICE 2,194,683

SILICEOUS PRODUCT AND METHOD OF MAKING THE SAME

Marion S. Badollet, Fanwood, N. J., assignor to Johns-Manville Corporation, New York, N. Y., a corporation of New York No Drawing. Application October 29, 1936, Serial No. 108,229

8 Claims. (Cl. 91—68)

This invention relates to a siliceous product and method of making the same, particularly to particles of diatomaceous earth comprising water-repellent material in the exterior portions thereof.

The present application is a continuation in part of application 666,225, filed by me on April 14, 1933.

Briefly stated, the invention comprises the method of making the exterior portions of siliceous particles reactive to a soluble soap and then treating the said particles with a solution of the soap. The invention comprises also the product of the said method.

In making the preferred type of composition, there are first formed activated siliceous particles, i. e., particles having, in their exterior portions, a slightly soluble compound of a multivalent metal adapted to react with a soluble soap, to form a soap that is less soluble in water than the said compound. The compound is then reacted with the soluble soap, to form the insoluble soap, as a water-repellent ingredient of the siliceous particles. The resulting product is treated to remove therefrom undesired, readily water-soluble materials and is then dried.

The preferred compound for reaction with the soluble soap is a silicate possessing the properties described, as, for example, relatively highly hydrated silicates of calcium and magnesium. In the method of the present application, such silicates, in reacting with soluble soaps, form calcium or magnesium soaps by the replacement of silicate radical in the calcium or magnesium silicates by the radical of a soap, such as the stearate or oleate radical of a sodium soap.

Thus, there may be provided a hydrated calcium silicate, that is relatively soluble, as compared, for example, with fused calcium silicate, by reacting comminuted diatomaceous earth with milk of lime in hot condition as described in U. S. Patent 1,574,363 issued to Calvert on February 23, 1926. The resulting activated product is filtered, washed with water, and then dried and milled to disintegrate lumps into fine particles. The product is then treated with a solution of soap in excess of the amount that will react with the calcium silicate in the surface portions of the particles, as, for example, with a solution of soap containing 3 parts by weight to 100 of water, or 2 to 3 parts of soap to 100 parts of the lime-treated diatomaceous earth product. The soap treatment is made suitably in lukewarm conditions, say at approximately 50° C., for a period of 15 minutes or longer.

During this treatment there is formed in situ, in the outer surface portions of the calcium silicate, a substantial amount of water insoluble calcium soap. This soap is an integral part of the outer surface portion of the particles and is integrally bound therein so that it is not readily removed by washing.

The resulting material is then filtered and subjected to thorough washing with water, suitably warm water, to dissolve out readily water-soluble materials present, including unused soap. It will be understood that water-soluble materials in the finished product would be highly undesirable, in the preferred embodiment of the invention, since such materials serve as media for the diffusion of water into a product which it is desired to have in waterproof or water-resistant form.

As an alternative for lime, in the above activation treatment of diatomaceous earth, there may be used another compound of a multivalent metal adapted to render the exterior of particles of diatomaceous earth reactive to a water-soluble soap. Thus, diatomaceous earth may be autoclaved with an aqueous suspension of barium hydroxide, strontium hydroxide, or an appreciably soluble and preferably basic magnesium compound, as, for example, with precipitated basic carbonate of magnesium or magnesium hydroxide, suitably, in the presence of a small proportion of sodium or potassium carbonate acting as a promoter. When a substantial amount of sodium or potassium carbonate is used, salts such as calcium or magnesium chlorides, sulfates, or nitrates may be employed as the source of the multivalent metal. More specifically, the activated diatomaceous earth may be the silicates made as described in U. S. Patent 1,959,346 issued to Cummins on May 22, 1934.

Very finely divided crystalline silica may be substituted for the diatomaceous earth in the above reactions, when the particular properties of the product made from diatomaceous silica are not desired.

The activated siliceous material is treated with soap, as described.

In drying products made in accordance with the present invention, the temperature of the drying should be below that of decomposition of soap present. I have used to advantage a temperature below 105° C. and suitably not substantially above 75° C.

As ordinarily made, the product of the present invention will contain sufficient insoluble soap to render it water-repellent, that is, resistant to penetration or quick wetting by water. A satisfactory proportion is 3% of soap on the weight of the total dried product.

Products made as described are useful as fillers for compositions of the same type in which finely divided diatomaceous earth has been employed heretofore as a filler.

The details that have been given are for the purpose of illustration and not restriction. It is intended that variations within the spirit of the invention are to be included within the scope of the appended claims.

What I claim is:

1. The method of treating diatomaceous earth to render the particles water-repellent, which comprises reacting comminuted diatomaceous earth with an aqueous mixture including a slightly soluble compound, selected from the group consisting of baryta, strontia, lime, basic carbonate of magnesium and magnesium hydroxide, to form a hydrated silicate on the exterior portions thereof, reacting the treated diatomaceous earth with an aqueous solution of a soluble soap to form thereon an integrally bound and insoluble soap, washing the resulting product to remove the excess water soluble material and then drying the washed material.

2. The method of treating diatomaceous earth to render the particles water-repellent, which comprises reacting comminuted diatomaceous earth with an aqueous mixture including a slightly soluble compound of an alkaline earth metal to form a hydrated silicate on the exterior portions thereof, reacting the treated diatomaceous earth with an aqueous solution of a soluble soap to form thereon an integrally bound and insoluble soap, washing the resulting product to remove the excess water soluble material and then drying the washed material.

3. The method of preparing water-repellent diatomaceous earth as described in claim 2, in which the slightly soluble alkaline earth compound is a magnesium compound.

4. The method of preparing water-repellent diatomaceous earth as described in claim 2, in which the slightly soluble alkaline earth compound is a calcium compound.

5. A water-repellent diatomaceous earth product comprising, in the surface portions of the particles thereof, the product of the reaction of an aqueous solution of a soluble soap with an alkaline earth metal chemically combined and integral with the said particles.

6. A water-repellent diatomaceous earth product comprising, in the surface portions of the particles thereof, the product of the reaction of an aqueous solution of a soluble soap with a product selected from the group consisting of baryta, strontia, lime, basic carbonate of magnesium, and magnesium hydroxide chemically combined and integral with the said particles.

7. A water-repellent diatomaceous earth product as defined in claim 5, in which the alkaline earth metal is magnesium.

8. A water-repellent diatomaceous earth product as defined in claim 5, in which the alkaline earth metal is calcium.

MARION S. BADOLLET.